United States Patent
Lin et al.

(10) Patent No.: US 11,808,631 B2
(45) Date of Patent: Nov. 7, 2023

(54) INFRARED SENSOR MODULE AND FOREHEAD THERMOMETER

(71) Applicant: RADIANT INNOVATION INC., Hsinchu County (TW)

(72) Inventors: Tseng-Lung Lin, Hsinchu County (TW); I-Ling Chen, Hsinchu County (TW); Chin-Hui Ku, Hsinchu (TW)

(73) Assignee: RADIANT INNOVATION INC., Hsinchu County (TW)

( * ) Notice: Subject to any disclaimer, the term of this patent is extended or adjusted under 35 U.S.C. 154(b) by 485 days.

(21) Appl. No.: 17/132,978

(22) Filed: Dec. 23, 2020

(65) Prior Publication Data
US 2022/0196478 A1 Jun. 23, 2022

(51) Int. Cl.
*G01J 5/00* (2022.01)
*G01J 5/0818* (2022.01)
*G01J 5/0808* (2022.01)

(52) U.S. Cl.
CPC ........... *G01J 5/0025* (2013.01); *G01J 5/0808* (2022.01); *G01J 5/0818* (2013.01)

(58) Field of Classification Search
CPC ...... G01J 5/0025; G01J 5/0808; G01J 5/0818; G01J 5/0265; G01J 5/04; G01J 5/07; G01J 5/0853; G01J 5/0879
USPC ....................... 374/121, 208, 126; 250/338.1
See application file for complete search history.

(56) References Cited

U.S. PATENT DOCUMENTS

| | | | |
|---|---|---|---|
| 7,048,437 B2 * | 5/2006 | Bellifernine | G01J 5/04 |
| | | | 374/208 |
| 10,309,835 B2 * | 6/2019 | Larsen | G01J 5/0011 |
| 2011/0228811 A1 * | 9/2011 | Fraden | G01J 5/08 |
| | | | 374/121 |
| 2013/0308676 A1 * | 11/2013 | Ho | G01J 5/04 |
| | | | 374/121 |

* cited by examiner

*Primary Examiner* — Brandi N Hopkins
*Assistant Examiner* — Janice M Soto
(74) *Attorney, Agent, or Firm* — Li & Cai Intellectual Property (USA) Office (57) ABSTRACT

An infrared sensor module and a forehead thermometer are provided. The infrared sensor module includes a light guide structure and an infrared sensor element. An annular hollow space is formed inside the light guide structure and passes therethrough. A first and second opening is formed on two opposite sides of the light guide structure, respectively. A diameter of the first opening is greater than a diameter of the second opening. The annular hollow space includes a matte and reflective area, the matte area has serration portions, and each of the serration portions extends from the first opening to the second opening and is arranged parallel to each other. The reflective area is formed between the second opening and the matte area. The infrared sensor element is disposed at the second opening. The forehead thermometer includes a casing, a circuit board, the infrared sensor module, and an operating switch.

14 Claims, 10 Drawing Sheets

INFRARED SENSOR MODULE AND FOREHEAD THERMOMETER

FIELD OF THE DISCLOSURE

The present disclosure relates to an infrared sensor module and a forehead thermometer, and more particularly to an infrared sensor module and a forehead thermometer having a light guide structure.

BACKGROUND OF THE DISCLOSURE

Firstly, when an infrared forehead thermometer is used for measuring human body temperatures in conventional technology, the forehead thermometer is usually required to be placed at 1 to 3 cm (or even closer) from the center of a forehead to avoid measuring infrared energy around the center of the forehead. This is to accurately measure the temperature of a human body, since an infrared sensor element used in the infrared forehead thermometer generally measures at a viewing angle greater than 120 degrees. Therefore, when the infrared forehead thermometer is positioned too far away from the human body, not only does the infrared emitted from the center of the human forehead enter the infrared forehead thermometer, but lower or higher infrared energy other than the infrared emitted from the center of the human forehead can also enter the forehead thermometer and be received by the infrared sensor element. This results in distortion of temperature values measured by the forehead thermometer.

Moreover, when the infrared forehead thermometer is positioned too far away from the human forehead, even if the infrared radiation that is emitted from the center of the human forehead enters the forehead thermometer, a part of the energy may still be lost due to the distance between the infrared forehead thermometer and the human forehead. This causes the infrared sensor element to receive the infrared and convert it into a signal that is too weak to be distinguished from noise, which also results in distortion of the temperature values measured by the forehead thermometer.

Therefore, how to improve an optical structural design of the forehead thermometer to make the forehead temperature measuring viewing angle to be smaller and to have a longer measuring distance for filtering out unnecessary external light, as well as simultaneously focusing the infrared radiation to enlarge or at least maintain the infrared energy received by the infrared sensor element, so as to overcome the above-mentioned shortcomings, has become one of the important issues to be solved in this field.

SUMMARY OF THE DISCLOSURE

In response to the above-referenced technical inadequacies, the present disclosure provides an infrared sensor module and a forehead thermometer.

In one aspect, the present disclosure provides an infrared sensor module. The infrared sensor module includes a light guide structure and an infrared sensor element. An annular hollow space is formed inside the light guide structure, the annular hollow space passes through the light guide structure, and a first opening and a second opening are formed on two opposite sides of the light guide structure, respectively. A diameter of the first opening is greater than a diameter of the second opening. The annular hollow space includes a matte area and a reflective area. The matte area has a plurality of serration portions, and each of the serration portions extends from the first opening to the second opening. The reflective area is formed between the second opening and the matte area. The infrared sensor element is disposed at the second opening.

In another aspect, the present disclosure provides a forehead thermometer. The forehead thermometer includes a casing, a circuit board, an infrared sensor module, an operating switch, and a display panel. The casing has an opening. The circuit board is disposed inside the casing. The infrared sensor module is disposed inside the casing and is electrically connected to the circuit board, and a first opening of the infrared sensor module is spatially communicated with the opening. The operating switch is disposed on the casing and is electrically connected to the circuit board. The operating switch is electrically connected to the infrared sensor module through the circuit board. The display panel is disposed on the casing and is electrically connected to the circuit board. The infrared sensor module includes a light guide structure and an infrared sensor element. An annular hollow space is formed inside the light guide structure, the annular hollow space passes through the light guide structure, and a first opening and a second opening are formed on two opposite sides of the light guide structure, respectively. A diameter of the first opening is greater than a diameter of the second opening. The annular hollow space includes a matte area and a reflective area. The matte area has a plurality of serration portions, and each of the serration portions extends from the first opening to the second opening. The reflective area is formed between the second opening and the matte area. The infrared sensor element is disposed at the second opening.

One of the beneficial effects of the present disclosure is that, in the infrared sensor module and the forehead thermometer provided herein, by virtue of "the infrared sensor module including a light guide structure and an infrared sensor element", "an annular hollow space being formed inside the light guide structure and the annular hollow space passing through the light guide structure, and a first opening and a second opening being formed on two opposite sides of the light guide structure, respectively", "a diameter of the first opening being greater than a diameter of the second opening", "the annular hollow space including a matte area and a reflective area", "the matte area having a plurality of serration portions, and each of the serration portions extending from the first opening to the second opening and being arranged parallel to each other", "the reflective area being formed between the second opening and the matte area", "the infrared sensor element being disposed at the second opening", "the forehead thermometer including a casing, a circuit board, an infrared sensor module, an operating switch, and a display panel", "a casing having an opening, and the first opening of the infrared sensor module being spatially communicated with the opening", "the circuit board and the infrared sensor module being disposed inside the casing", "the operating switch being disposed on the casing and electrically connected to the circuit board, and the operating switch being electrically connected to the infrared sensor module through the circuit board", and "the display panel being disposed on the casing and electrically connected to the circuit board.", the infrared sensor module and the forehead thermometer can filter out unnecessary external light at a longer measuring distance, as well as simultaneously enlarging or at least maintaining the infrared energy received by the infrared sensor element to improve the accuracy of the human body temperature that is measured.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

References are made to FIG. 1 to FIG. 4, in which an infrared sensor module is provided in a first embodiment of the present disclosure. The infrared sensor module includes a light guide structure 1 and an infrared sensor element 2. An annular hollow space 10 is formed inside the light guide structure 1. The annular hollow space 10 passes through the light guide structure 1, and a first opening 101 and a second opening 102 are formed on two opposite sides of the light guide structure 1, respectively. It should be noted that a diameter of the first opening 101 is greater than a diameter of the second opening 102.

The light guide structure 1 is further described herein. References are made to FIG. 1 and FIG. 4, in which the annular hollow space 10 includes a matte area 103 and a reflective area 104. A length L1 of the matte area 103 is 1 to 3 times a length L2 of the reflective area 104, and an inner diameter of the matte area 103 is greater than or equal to an inner diameter of the reflective area 104. The matte area 103 has a plurality of serration portions 105 that are arranged in a continuous manner. Each of the serration portions 105 extends from the first opening 101 to the second opening 102, and furthermore, a tooth-like tip of each of the serration portions 105 extends from the first opening 101 to the second opening 102, such that each of the serration portions 105 extends along an axis of the annular hollow space 10. A surface of the serration portions 105 is rough and can be coated with a layer of black matte paint. The reflective area 104 is formed between the second opening 102 and the matte area 103. A surface of the reflective area 104 is a parabolic mirror surface and is plated with a layer of metal such as nickel or gold that has high infrared reflectivity, such that the surface of the reflective area 104 can better reflect and focus the infrared.

Figure 1:
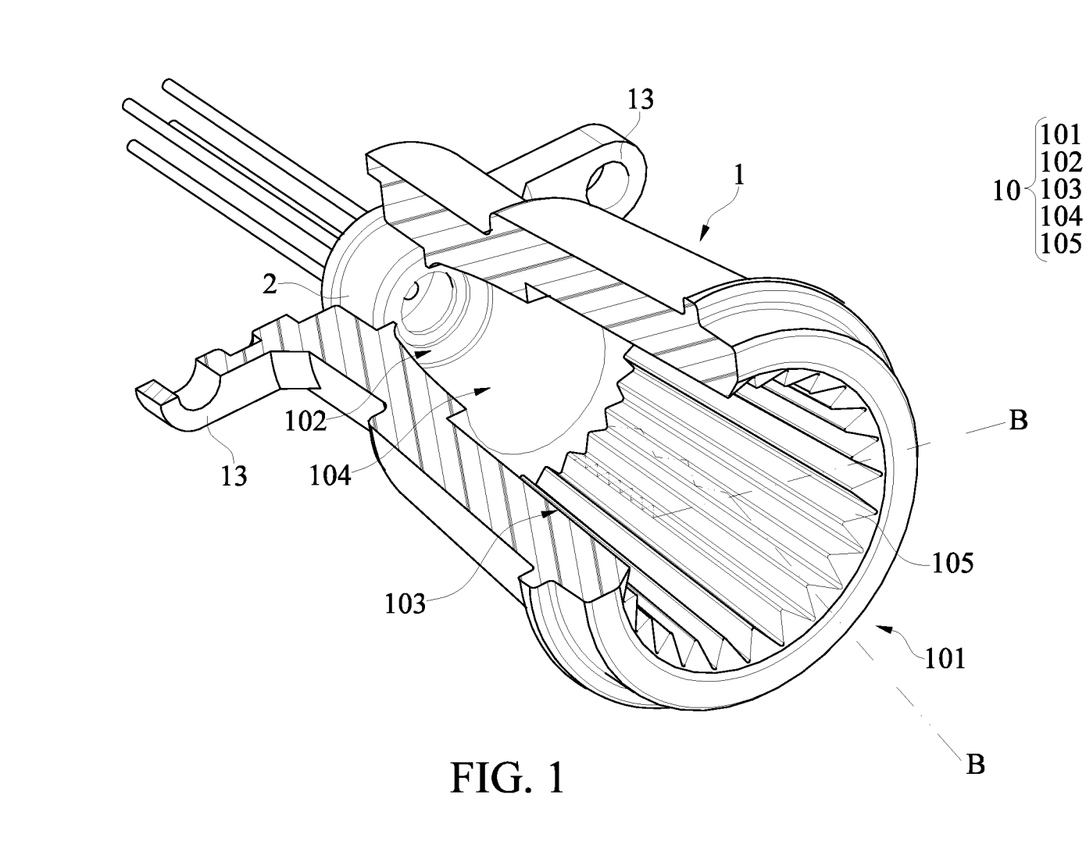
FIG. 1 is a cross-sectional perspective view of an infrared sensor module according to a first embodiment of the present disclosure.
Figure 2:
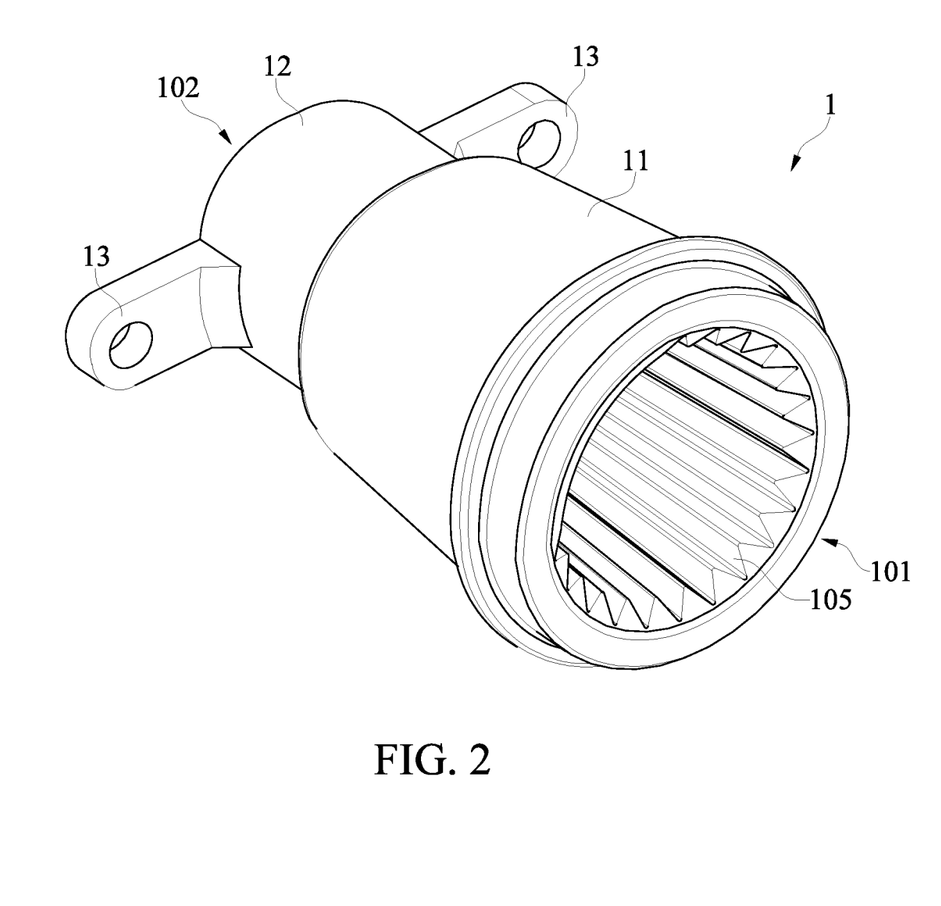
FIG. 2 is a schematic perspective view of a light guide structure of the infrared sensor module according to the first embodiment of the present disclosure.
Figure 3:
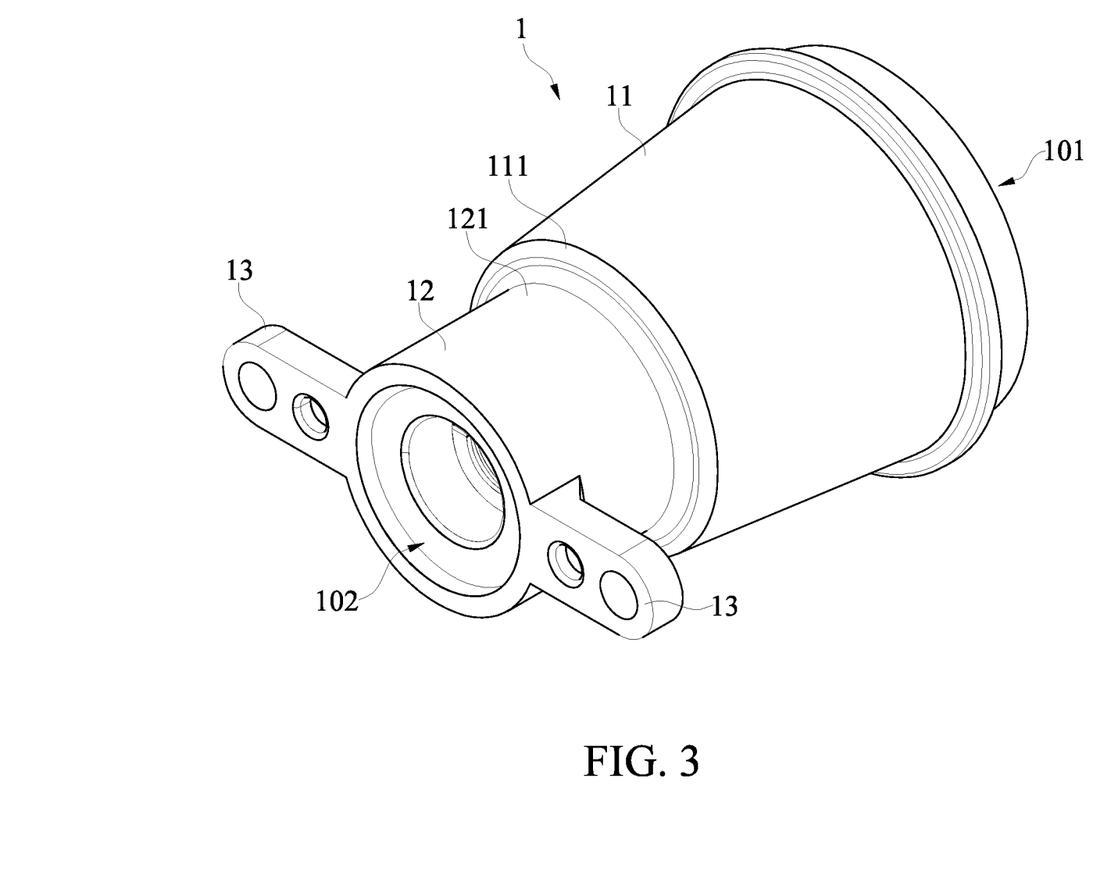
FIG. 3 is another schematic perspective view of the light guide structure of the infrared sensor module according to the first embodiment of the present disclosure.
Figure 4:
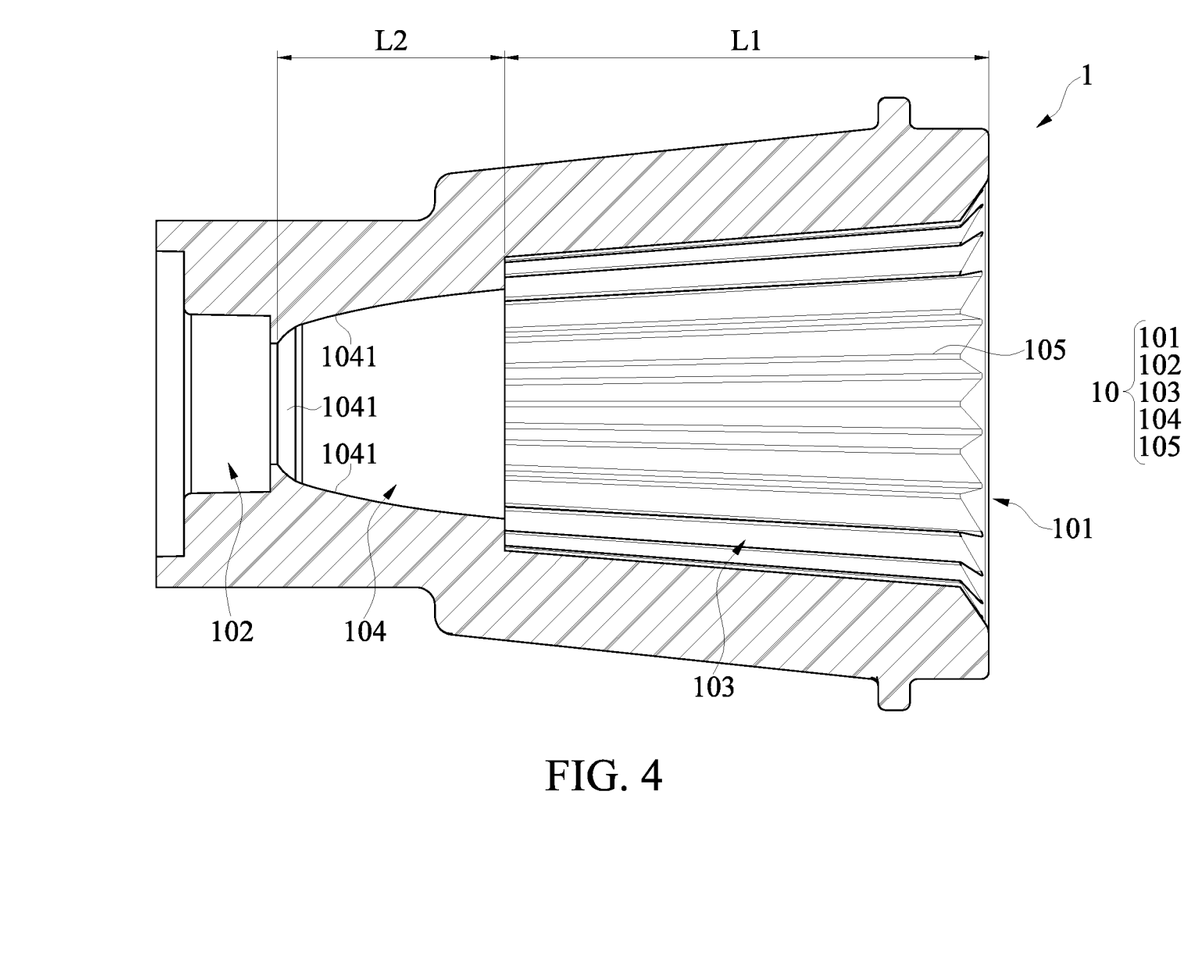
FIG. 4 is a schematic cross-sectional view of the light guide structure of the infrared sensor module according to the first embodiment of the present disclosure.

The infrared sensor element 2 can be disposed at the second opening 102. The infrared sensor element 2 can receive infrared that is emitted from the center of the human forehead, and then convert the infrared into a signal that can be displayed using temperature units. Therefore, when the infrared is emitted from the center of the human forehead and enters an infrared sensor module M through the first opening 101, the infrared passes the matte area 103 and the reflective area 104 sequentially, before finally being received by the infrared sensor element 2.

However, due to the infrared sensor module not being in direct contact with the human forehead, it is inevitable that light B (including infrared) present around the center of the forehead will also enter the infrared sensor module through the first opening 101. In detail, since the infrared sensor module is aimed at the center of the human forehead for measuring temperatures, the infrared that is emitted from the center of the human forehead and the light B that is around the center of the forehead are two different light sources. The infrared being emitted from the center of the human forehead enters the infrared sensor module through the first opening 101 at a small angle, while the light B being around the center of the forehead enters the infrared sensor module through the first opening 101 at a large angle, as shown in FIG. 1.

Reference is further made to FIG. 1, showing the infrared (not shown in the figures) being emitted from the center of the human forehead and entering into the annular hollow space 10 in the light guide structure 1. Since the infrared that is emitted from the center of the human forehead has a smaller incident angle, the infrared comes in contact with the matte area 103, but does not come in contact with the reflective area 104. The infrared is then reflected once or multiple times and focused by the surface of the reflective area 104, and enters the infrared sensor element 2. As mentioned above, since the reflective area 104 is a smooth mirror surface or a smooth surface that is plated with bright nickel, the infrared being emitted from the center of the human forehead will not lose energy when the infrared is reflected by the surface of the reflective area 104. Therefore, the infrared sensor element 2 can receive and convert an entirety of infrared that is emitted from the center of the human forehead to stronger signals, such that signals are not so weak as to be covered by the noise.

On the other hand, the light B around the center of the forehead enters the annular hollow space 10 in the light guide structure 1 at a large angle, so that it will reach the serration portions 105 of the matte area 103 first. As mentioned above, structures of the serration portions 105 extend along the axis of the annular hollow space 10, and the surface of the serration portions 105 is rough or coated with a layer of black matte paint; therefore, when external light B reaches the serration portions 105, the external light B will reflect continuously between the surfaces of the serration portions 105. The energy of the external light B that is continuously reflected between the surfaces of the serration portions 105 will constantly experience loss and have energy escape, and will not be received by the infrared sensor element 2. Furthermore, since the length L1 of the matte area 103 is 1 to 3 times the length L2 of the reflective area 104, ensuring that the length of the reflection path of the light B around the center of the forehead in the matte area 103 is long enough, a probability of the light B around the center of the forehead being lost is increased.

In this present embodiment, the inner diameter of the matte area 103 is gradually tapered inward (toward the reflective area 104) from the first opening 101. That is, the tooth-like tips of the serration portions 105 form a tapered structure. In addition, in this present embodiment, a surface profile of the reflective area 104 is a paraboloid and the infrared sensor element is located at a focus point of the paraboloid. In this way, the infrared that is emitted from the human body can be further concentrated through surface reflection of the reflective area 104 and be received by the infrared sensor element 2, such that the signal strength of the converted temperature signal is further improved. In other words, in comparison with conventional technology, the light guide structure 1 provided in the present disclosure can reduce infrared energy outside of the center of the forehead at a longer measuring distance and increase the focus of the infrared energy at the center of the forehead.

Second Embodiment

Figure 5:
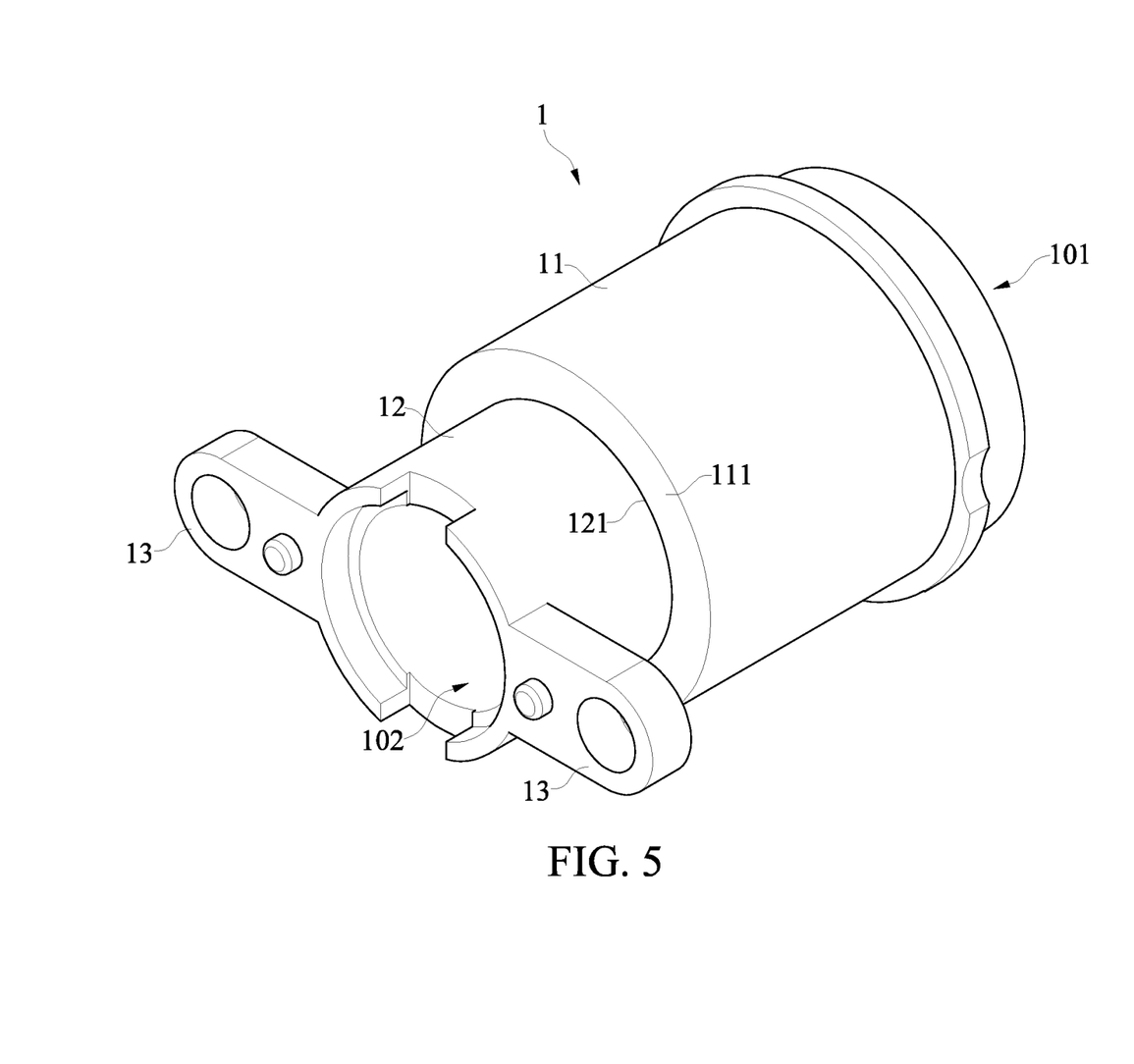
FIG. 5 is a schematic perspective view of a light guide structure of an infrared sensor module according to a second embodiment of the present disclosure.
Figure 6:
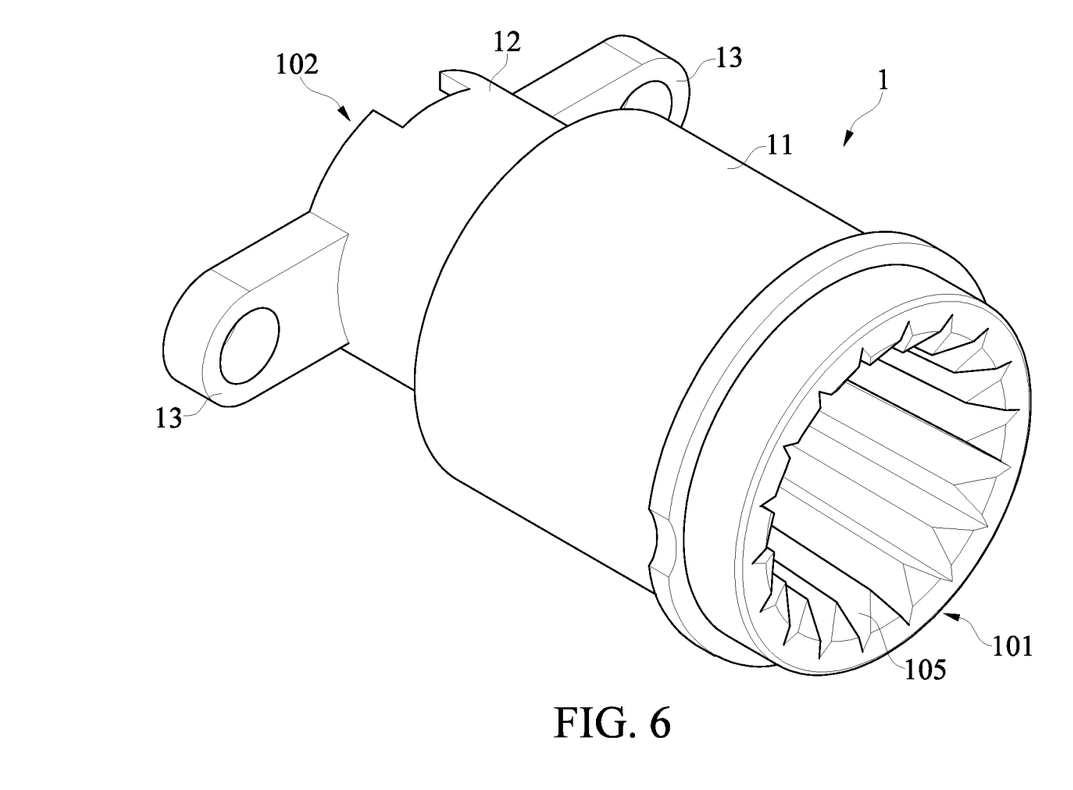
FIG. 6 is another schematic perspective view of the light guide structure of the infrared sensor module according to the second embodiment of the present disclosure.
Figure 7:
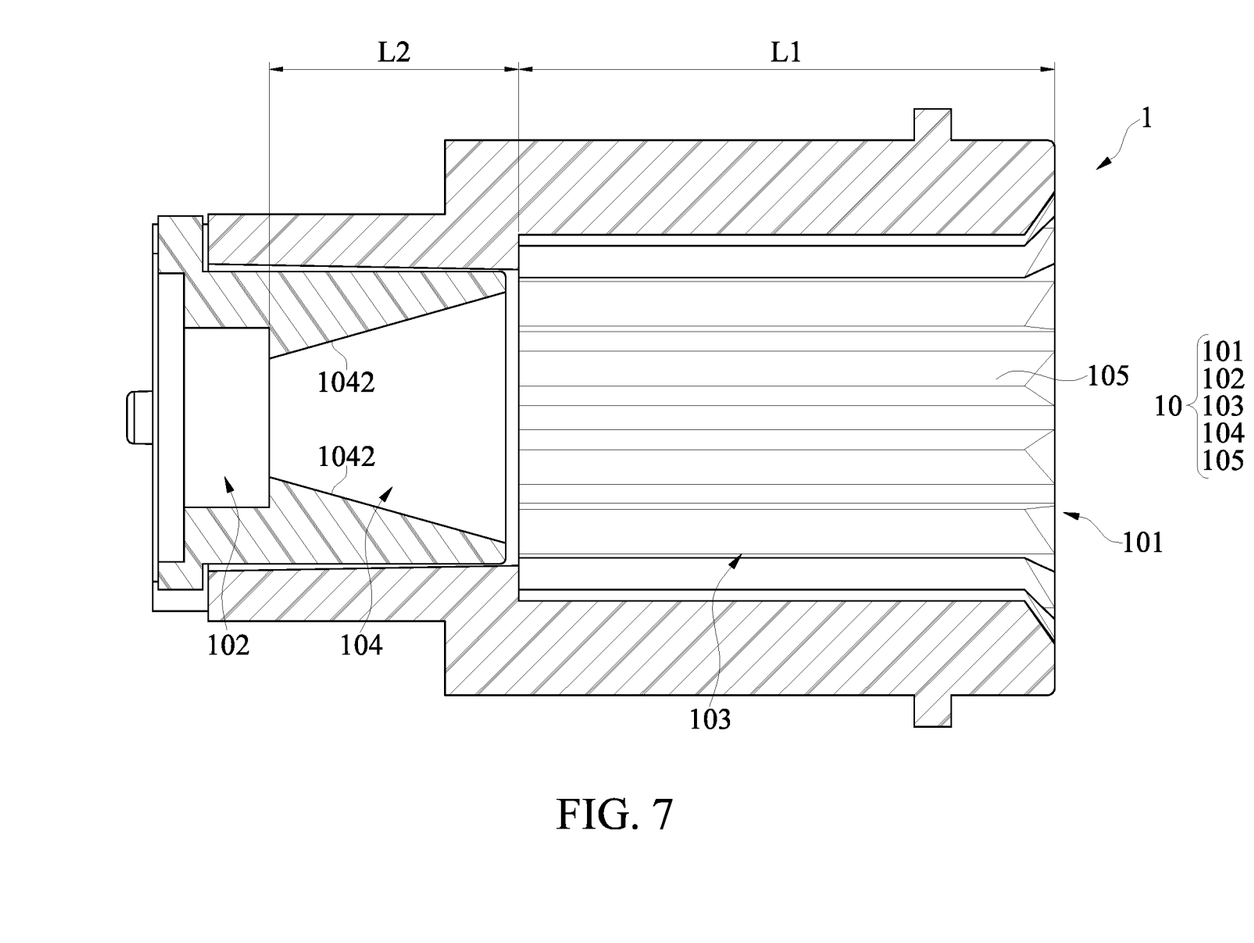
FIG. 7 is a schematic cross-sectional view of the light guide structure of the infrared sensor module according to the second embodiment of the present disclosure.

References are made to FIGS. 5 to 7, showing another embodiment of the light guide structure of the present disclosure. The surface characteristics of the matte area 103 and the reflective area 104, and the usage of the matte area 103 and the reflective area 104 in the present embodiment are the same as those in the first embodiment, and will not be repeated herein. The main difference between the present embodiment and the first embodiment is that the tooth-like tips of the serration portions 105 form a cylindrical structure, and a surface profile of the reflective area 104 is an isosceles trapezoid.

Furthermore, in this embodiment, a light guide structure 1 includes a first light guide structure 11 and a second light guide structure 12 that are connected with each other. A matte area 103 is disposed inside the first light guide structure 11, a first opening is formed on the first light guide structure 11, a reflective area 104 is disposed inside the second light guide structure 12, and a second opening is formed on the second light guide structure 12. The first light guide structure 11 includes a third opening 111, and the second light guide structure 12 includes a fourth opening 121. The first light guide structure 11 and the second light guide structure 12 are connected with each other through the third opening 111 and the fourth opening 121, respectively, and a diameter of the third opening 111 is greater than or equal to a diameter of the fourth opening 121.

In other words, the light guide structure 1 in the first embodiment is an integrally formed element, while in the second embodiment, the light guide structure 1 is a combination of elements formed by connecting the first light guide structure 11 and the second light structure 12 together.

It is worth mentioning that although the surface profile of the reflective area 104 in the first embodiment is a paraboloid, and the surface profile of the reflective area 104 in the second embodiment is an isosceles trapezoid, the present disclosure is not limited thereto. In other embodiments, the surface profile of the reflective area 104 can also be an ellipse.

References are made to FIGS. 1, and 8 to 10, in which a forehead thermometer Z is provided in the present disclosure. The forehead thermometer Z includes a casing 3, a circuit board 4, an operating switch 5, a display panel 6 and an infrared sensor module M of the present disclosure. The infrared sensor module M is disposed inside the casing 3 and is electrically connected to the circuit board 4. The infrared sensor module M includes the light guide structure 1 and an infrared sensor element 2.

Figure 10:
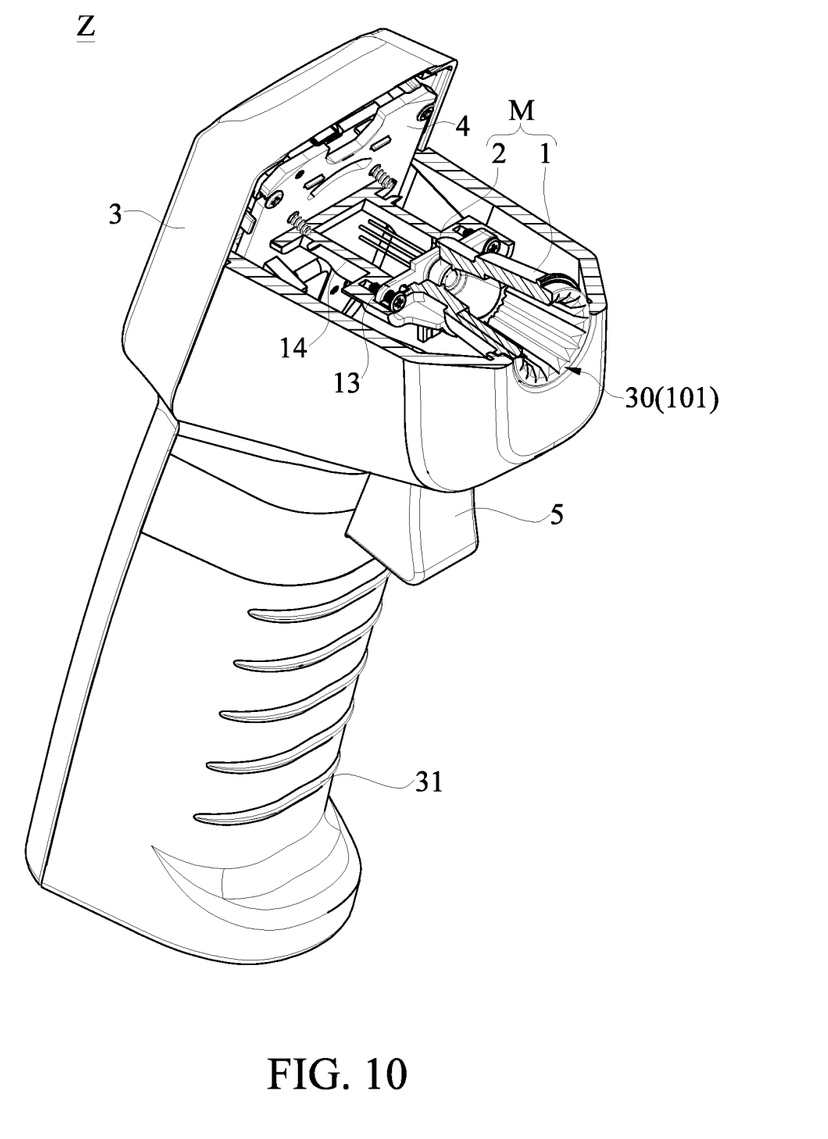
FIG. 10 is a cross-sectional perspective view of the forehead thermometer of the present disclosure.

The infrared sensor element 2 is electrically connected to the circuit board 4. The light guide structure 1 has a connecting member 13, and the connecting member 13 is disposed on an outer surface of the light guide structure 1. The light guide structure 1 of the present disclosure is first connected to a fixing member 14 through the connecting member 13, and then secured on the circuit board 4 by the fixing member 14. It should be noted that the connecting member 13 can have other configurations and connection methods depending on different implementations. The above-mentioned example is only one of feasible embodiments, and is not intended to limit the present disclosure.

An annular hollow space 10 is formed inside the light guide structure 1, the annular hollow space 10 passes through the light guide structure 1, and a first opening 101 and a second opening 102 are formed on two opposite sides of the light guide structure 1, respectively. A diameter of the first opening 101 is greater than a diameter of the second opening 102. The annular hollow space 10 includes a matte area 103 and a reflective area 104. The matte area 103 has a plurality of serration portions 105 that are arranged in a continuous manner.

Each of the serration portions 105 extends from the first opening 101 to the second opening 102. The reflective area 104 is formed between the second opening 102 and the matte area 103, and the infrared sensor element 2 is disposed at the second opening 102.

When the infrared sensor module M is disposed inside the casing 3, the first opening 101 is spatially communicated with an opening 30. That is, the first opening 101 and the opening 30 are spatially communicated while overlapping with each other, so that infrared being emitted from the center of the human forehead or light B being around the center of the forehead can enter the infrared sensor module M through the opening 30 (or the first opening 101) and can be received by the infrared sensor element 2.

Figure 8:
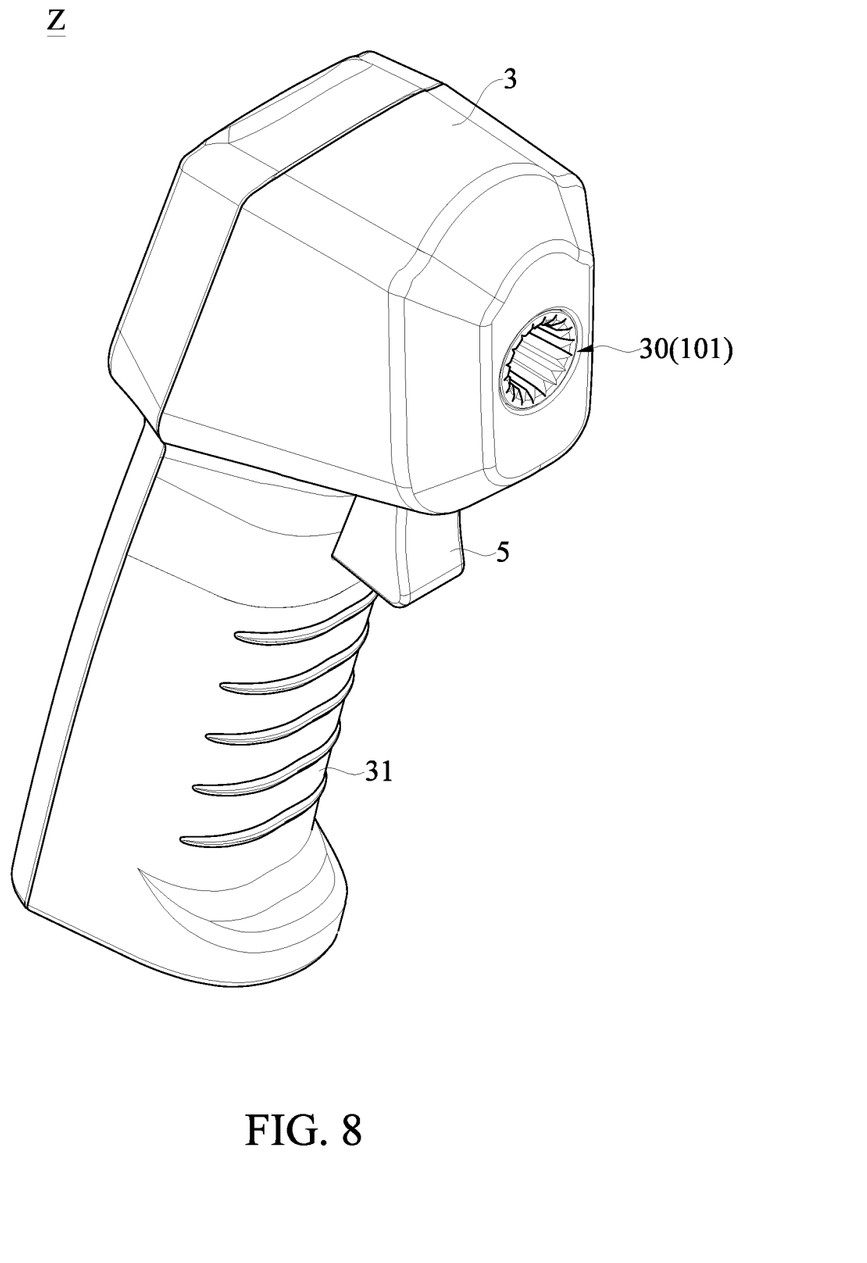
FIG. 8 is a schematic perspective view of a forehead thermometer of the present disclosure.
Figure 9:
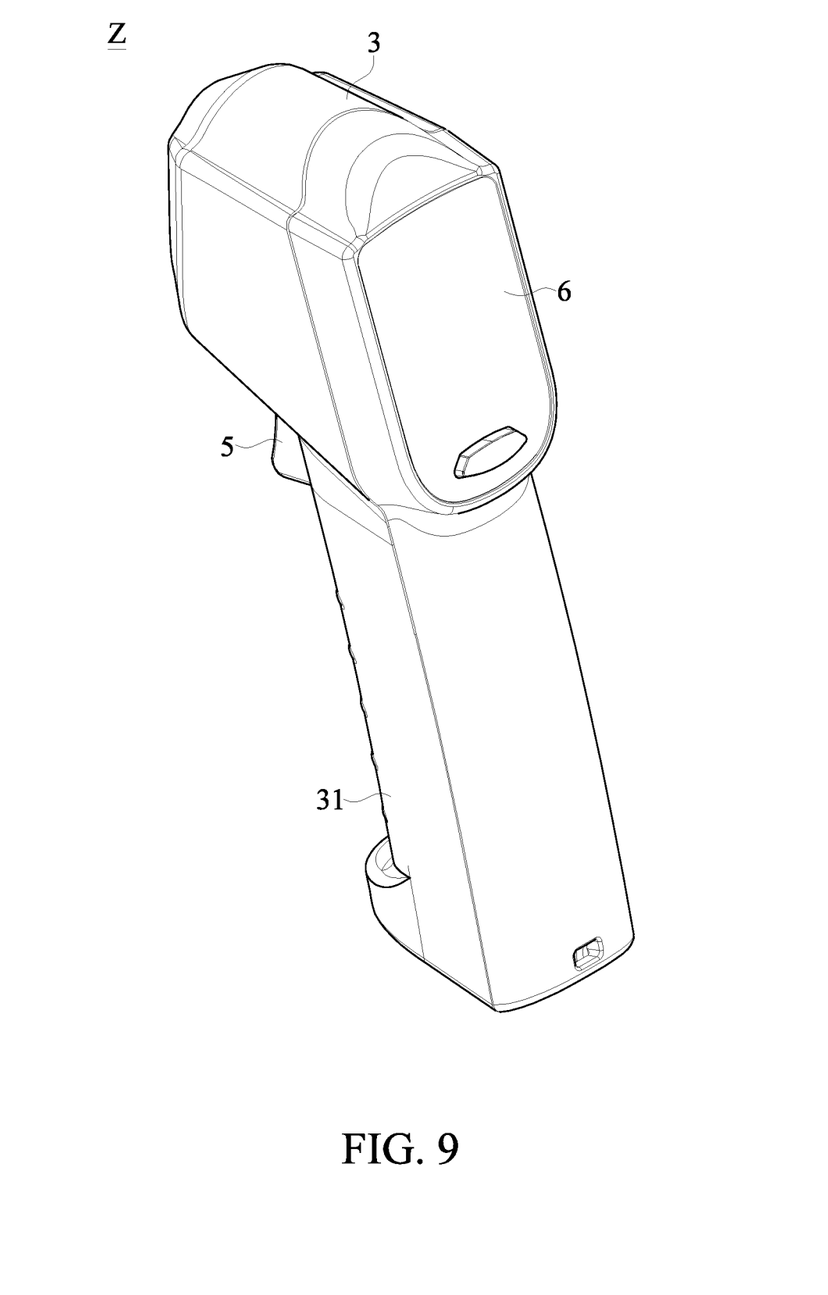
FIG. 9 is another schematic perspective view of the forehead thermometer of the present disclosure.

The operating switch 5 is disposed on the casing 3 and is electrically connected to the circuit board 4. The operating switch 5 is electrically connected to the infrared sensor module M through the circuit board 4. The display panel 6 is disposed on the casing 3 and is electrically connected to the circuit board 4. A user activates and controls the infrared sensor module M through the operating switch 5 to perform infrared temperature measurement, and the temperature value that is measured is displayed on the display panel 6 for the user to view.

Beneficial Effects of the Embodiments

One of the beneficial effects of the present disclosure is that, in the infrared sensor module M and the forehead thermometer Z as provided, by virtue of "the infrared sensor module M including a light guide structure 1 and an infrared sensor element 2", "an annular hollow space 10 being formed inside the light guide structure 1, the annular hollow space 10 passing through the light guide structure 1, and a first opening 101 and a second opening 102 being formed on two opposite sides of the light guide structure 1, respectively", "a diameter of the first opening 101 being greater than a diameter of the second opening 102", "the annular hollow space 10 including a matte area 103 and a reflective area 104", "the matte area 103 having a plurality of serration portions 105, and each of the serration portions 105 extending from the first opening 101 to the second opening 102 and being arranged parallel to each other", "the reflective area 104 being formed between the second opening 102 and the matte area 103", "the infrared sensor element 2 being disposed at the second opening 102", "a forehead thermometer Z including a casing 3, a circuit board 4, an infrared sensor module M, and an operating switch 5", "the casing 3 having an opening 30, and the first opening 101 of the infrared sensor module M being spatially communicated with the opening 30", "the circuit board 4 and the infrared sensor module M being disposed inside the casing 3", and "the operating switch 5 being disposed on the casing 3 and electrically connected to the circuit board 4, and the operating switch 5 being electrically connected to the infrared sensor module M through the circuit board 4", the infrared sensor module M and the forehead thermometer Z can filter out unnecessary external light, as well as simultaneously enlarging or at least maintaining the infrared energy received by the infrared sensor element to improve the accuracy of the human body temperature that is measured.

Furthermore, since the external light B enters the infrared sensor module M of the present disclosure at a large angle, the infrared that is emitted from the center of the human forehead enters the infrared sensor module M of the present disclosure at a relatively small angle. Therefore, in the present disclosure, the matte area 103 in the light guide structure 1 is utilized to filter out the external light B at the large angle to improve the accuracy of the temperature that is measured. In addition, in the present disclosure, the reflective area 104 in the light guide structure 1 is utilized to reflect the infrared that is emitted from the center of the human forehead to enlarge or at least to maintain the infrared energy being emitted therefrom. In this way, the infrared that is emitted from the center of the human forehead does not lose much energy when being received by the infrared sensor element 2, such that the converted temperature signal is not too weak. That is, in comparison with the conventional technology, the light guide structure 1 provided in the present disclosure can reduce infrared energy around the center of the forehead at a longer measuring distance and increase the focus of the infrared energy at the center of the forehead.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An infrared sensor module, comprising:
   a light guide structure, wherein an annular hollow space is formed inside the light guide structure, the annular hollow space passes through the light guide structure, and a first opening and a second opening are formed on two opposite sides of the light guide structure, respectively, wherein a diameter of the first opening is greater than a diameter of the second opening, wherein the annular hollow space includes a matte area and a reflective area, the matte area has a plurality of serration portions, and each of the serration portions extends from the first opening to the second opening, and wherein the reflective area is formed between the second opening and the matte area; and
   an infrared sensor element disposed at the second opening;
   wherein the light guide structure includes a first light guide structure and a second light guide structure that are connected with each other, wherein the matte area is disposed inside the first light guide structure, and the first opening is formed on the first light guide structure, and wherein the reflective area is disposed inside the second light guide structure, and the second opening is formed on the second light guide structure;
   wherein the first light guide structure includes a third opening, and the second light guide structure includes a fourth opening, and wherein the first light guide structure and the second light guide structure are connected with each other through the third opening and the fourth opening, respectively, and a diameter of the third opening is greater than or equal to a diameter of the fourth opening.

2. The infrared sensor module according to claim 1, wherein a length of the matte area is 1 to 3 times a length of the reflective area, and an inner diameter of the matte area is greater than or equal to an inner diameter of the reflective area.

3. The infrared sensor module according to claim 1, wherein a surface of each of the serration portions is a rough surface.

4. The infrared sensor module according to claim 1, wherein a surface of each of the serration portions is coated with a layer of black matte paint.

5. The infrared sensor module according to claim 1, wherein a surface of the reflective area is a parabolic mirror surface.

6. The infrared sensor module according to claim 1, wherein a surface of the reflective area is plated with a layer of nickel.

7. The infrared sensor module according to claim 1, wherein a surface profile of the reflective area is a paraboloid, an isosceles trapezoid, or an ellipse.

8. A forehead thermometer, comprising:
a casing having an opening;
a circuit board disposed inside the casing;
an infrared sensor module disposed inside the casing and electrically connected to the circuit board, and the infrared sensor module including a light guide structure and an infrared sensor element, wherein an annular hollow space is formed inside the light guide structure, the annular hollow space passes through the light guide structure, and a first opening and a second opening are formed on two opposite sides of the light guide structure, respectively, wherein a diameter of the first opening is greater than a diameter of the second opening, wherein the annular hollow space includes a matte area and a reflective area, the matte area has a plurality of serration portions, and each of the serration portions extends from the first opening to the second opening, wherein the reflective area is formed between the second opening and the matte area, and wherein the infrared sensor element is disposed at the second opening, and the first opening is spatially communicated with the opening of the casing;
an operating switch disposed on the casing and electrically connected to the circuit board, wherein the operating switch is electrically connected to the infrared sensor module through the circuit board; and
a display panel disposed on the casing and electrically connected to the circuit board;
wherein the light guide structure includes a first light guide structure and a second light guide structure that are connected with each other, wherein the matte area is disposed inside the first light guide structure, and the first opening is formed on the first light guide structure, and wherein the reflective area is disposed inside the second light guide structure, and the second opening is formed on the second light guide structure;
wherein the first light guide structure includes a third opening, and the second light guide structure includes a fourth opening, and wherein the first light guide structure and the second light guide structure are connected with each other through the third opening and the fourth opening, respectively, and a diameter of the third opening is greater than or equal to a diameter of the fourth opening.

9. The forehead thermometer according to claim 8, wherein a length of the matte area is 1 to 3 times a length of the reflective area, and an inner diameter of the matte area is greater than or equal to an inner diameter of the reflective area.

10. The forehead thermometer according to claim 8, wherein a surface of each of the serration portions is a rough surface.

11. The forehead thermometer according to claim 8, wherein a surface of each of the serration portions is coated with a layer of black matte paint.

12. The forehead thermometer according to claim 8, wherein a surface of the reflective area is a parabolic mirror surface.

13. The forehead thermometer according to claim 8, wherein a surface of the reflective area is plated with a layer of nickel.

14. The forehead thermometer according to claim 8, wherein a surface profile of the reflective area is a paraboloid, an isosceles trapezoid, or an ellipse.

* * * * *